(12) United States Patent
Emani et al.

(10) Patent No.: US 12,278,866 B2
(45) Date of Patent: Apr. 15, 2025

(54) SCALED VEHICLE COMMUNICATIONS ARCHITECTURE SYSTEM

(71) Applicant: GM GLOBAL TECHNOLOGY OPERATIONS LLC, Detroit, MI (US)

(72) Inventors: Sitaram Emani, Novi, MI (US); Venkata Naga Siva Vikas Vemuri, Farmington Hills, MI (US); Scott T. Droste, West Bloomfield, MI (US); Andrew J. MacDonald, Grosse Pointe Park, MI (US); Chenna Kesava R. Sankepalle, Northville, MI (US); Brian Rennells, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 118 days.

(21) Appl. No.: 18/191,393

(22) Filed: Mar. 28, 2023

(65) Prior Publication Data

US 2024/0329962 A1  Oct. 3, 2024

(51) Int. Cl.
| | |
|---|---|
| *G06F 8/65* | (2018.01) |
| *G07C 5/00* | (2006.01) |
| *H04L 67/12* | (2022.01) |
| *H04L 9/32* | (2006.01) |
| *H04L 12/40* | (2006.01) |
| *H04W 16/18* | (2009.01) |

(52) U.S. Cl.
CPC .............. *H04L 67/12* (2013.01); *G06F 8/65* (2013.01); *G07C 5/008* (2013.01); *H04L 9/3239* (2013.01); *H04L 12/40* (2013.01); *H04W 16/18* (2013.01)

(58) Field of Classification Search
CPC ......... G06F 8/65; H04L 12/40; H04L 9/3239; H04L 67/12; H04W 16/18; G07C 5/008
See application file for complete search history.

(56) References Cited

U.S. PATENT DOCUMENTS

| | | | |
|---|---|---|---|
| 2014/0170986 A1* | 6/2014 | Blaunshtein | .......... H04W 16/18 455/67.13 |
| 2019/0265965 A1* | 8/2019 | Acharya | ................. H04L 12/40 |
| 2022/0012043 A1* | 1/2022 | Sakurai | ................. H04L 9/3239 |

OTHER PUBLICATIONS

Zhang et al, CN_113703822, (translation), Nov. 1, 2022, 21 pgs <CN_113703822.pdf>.*

(Continued)

*Primary Examiner* — Tuan A Vu
(74) *Attorney, Agent, or Firm* — Quinn IP Law

(57) ABSTRACT

A method of prioritizing updates to vehicles includes receiving one or more update requests for a first vehicle; determining a receiving capacity of the first vehicle; checking status of a battery and communications of the first vehicle; prioritizing the one or more update requests based on the receiving capacity of the first vehicle; and sending the prioritized update requests to the first vehicle. The method may include receiving one or more update requests for an additional vehicle; determining a receiving capacity of the additional vehicle; prioritizing the one or more update requests based on the receiving capacity of the additional vehicle; sending the prioritized update requests to the additional vehicle: and determining whether the vehicles are part of a common location group. Creating profiles from sets of communications available for the vehicle and selecting the best connection speed from profiles. Updating radio maps based on connection speeds.

5 Claims, 6 Drawing Sheets

(56) References Cited

OTHER PUBLICATIONS

Fang et al, CN 107454650, (translation), Dec. 24, 2019, 11 pgs <CN_107454650.pdf>.*
JP_6904067, (translation) Jul. 14, 2021, 7 pgs <JP_6904067>.*

* cited by examiner

SCALED VEHICLE COMMUNICATIONS ARCHITECTURE SYSTEM

INTRODUCTION

The present disclosure relates to methods for selecting and prioritizing vehicle communications, including over-the-air (OTA) updates, and the like for vehicles.

SUMMARY

A method of prioritizing updates to vehicles, such as with a non-transitory computer-readable storage medium on which is recorded instructions embodying the method. Execution of the instructions by a processor causes the processor to perform the steps of receiving one or more update requests for a first vehicle; determining a receiving capacity of the first vehicle; checking status of a battery and communications of the first vehicle; prioritizing the one or more update requests based on the receiving capacity of the first vehicle; and sending the prioritized update requests to the first vehicle.

The method may include receiving one or more update requests for an additional vehicle; determining a receiving capacity of the additional vehicle; prioritizing the one or more update requests for the additional vehicle based on the receiving capacity of the additional vehicle; and sending the prioritized update requests to the additional vehicle.

The method may include batching the prioritized update requests between the first vehicle and the additional vehicle or sending the prioritized update requests via a cellular communications system. The method may include sending the prioritized update requests via the cellular communications system from a back office.

The method may include determining a quality of a wireless network within range of the first vehicle, and if the wireless network has high quality, sending the prioritized update requests to the first vehicle. If the wireless network does not have high quality, the method includes querying a radio map for an area of higher quality connection. The method may also include, if the wireless network does not have high quality, delaying sending the prioritized update requests to the first vehicle until the first vehicle is in the area of higher quality connection, and determining the quality of the wireless network includes querying radio maps.

The method may include determining whether the first vehicle and the additional vehicle are part of a common location group; determining a common data profile for the common location group; and pushing a common campaign of updates with the common data profile for the entire common location group.

The method may include requesting over-the-air updates from a cloud; determining whether a cellular network has sufficient capabilities to push the over-the-air updates to the first vehicle; if the cellular network does not have sufficient capabilities to push the over-the-air updates, sending the over-the-air updates to a backlog manager, which stores the over-the-air updates; and if the cellular network does have sufficient capabilities to push the over-the-air updates, pushing the over-the-air updates to a machine to machine controller of the first vehicle. The method may also include optimizing a network access device to only use the machine to machine controller, which saves power relative to waking the entire network access device.

The method may include creating a first profile based on a first set of communications available one vehicle and creating a second profile based on a second set of communications available to that one vehicle. The best connection speed may be selected from the first profile and second profile and one or more radio maps may be updated based on the best connection speed from the first profile and second profile. The method may also include sending feedback to a communications controller based on the best connection speed from the first profile and second profile.

The above features and advantages and other features and advantages of the present disclosure are readily apparent from the following detailed description of the best modes for carrying out the disclosure when taken in connection with the accompanying drawings.

DETAILED DESCRIPTION

Figure 1:
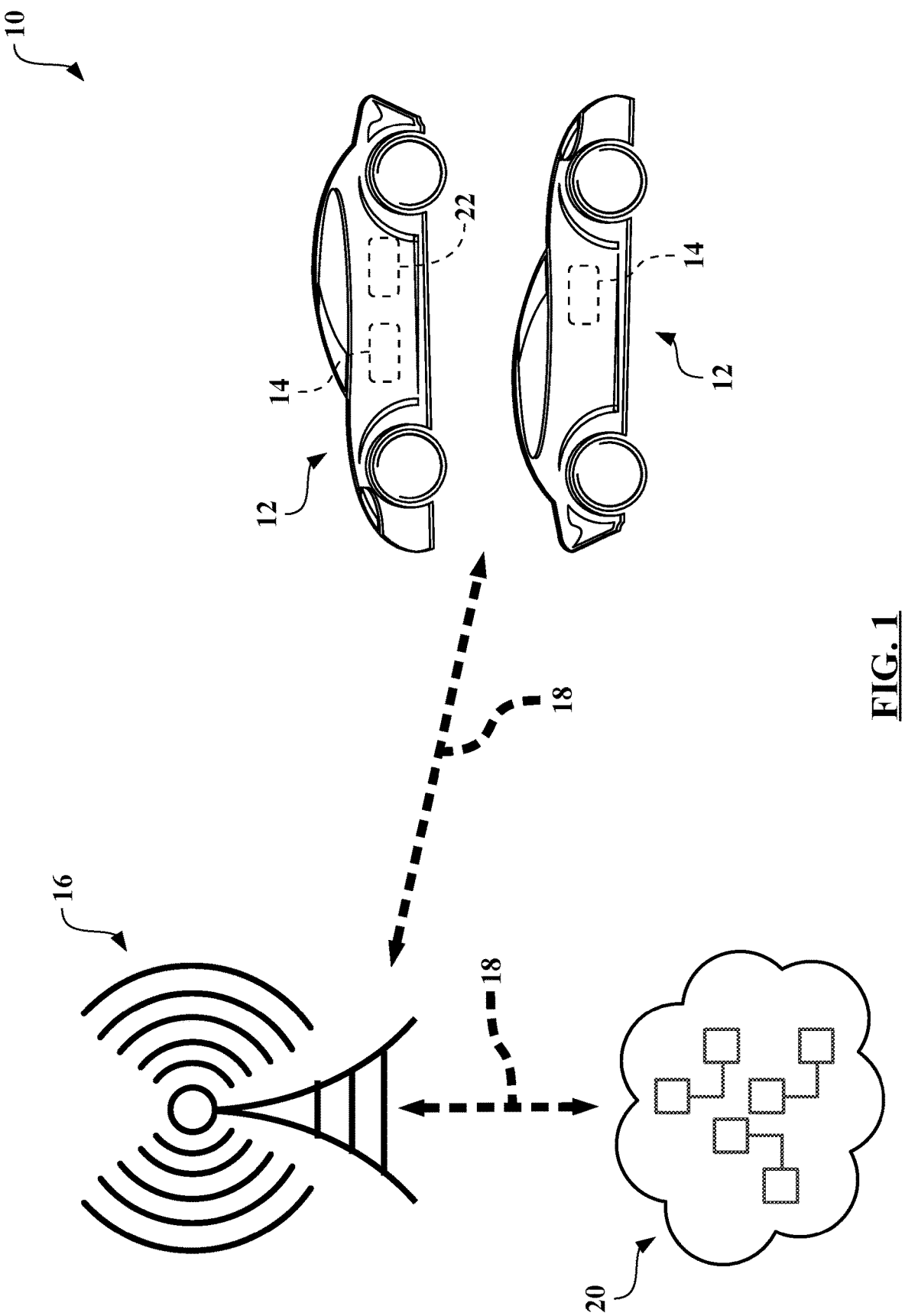
FIG. 1 is a schematic diagram of a connectivity network or connectivity system for determining priority of updates to one or more vehicles.

Referring to the drawings, like reference numbers refer to similar components, wherever possible, FIG. 1 schematically illustrates a connectivity network or connectivity system 10, which may be used to determine how to best, and most efficiently, send updates to one or more vehicles 12.

A generalized control system, computing system, or controller 14 is operatively in communication with relevant components of, at least, the recipient vehicle 12. The controller 14 includes, for example and without limitation, a non-generalized, electronic control device having a preprogrammed digital computer or processor, a memory, storage, or non-transitory computer-readable storage medium used to store data such as control logic, instructions, lookup tables, etc., and a plurality of input/output peripherals, ports, or communication protocols.

Furthermore, the controller 14 may include, or be in communication with, a plurality of sensors. The controller 14 is configured to execute or implement all control logic or instructions described herein and may be communicating with any sensors described herein or recognizable by skilled artisans. The controller 14 may be dedicated to the specific aspects of the recipient vehicle 12 described herein, or the controller 14 may be part of a larger control system that manages numerous functions of the vehicles 12. For electric vehicles, or other vehicles, ignition off and power off may be considered substantially the same state.

Each of the vehicles 12 includes one or more controllers 14, as do several other components shown in the figures. Any of the methods described herein may be executed by one or more controllers 14.

The connectivity system 10 shown in FIG. 1, or other connectivity systems 10 recognizable to those having ordinary skill in the art, may be used to execute methods of prioritizing updates to vehicles 12. The methods include receiving one or more update requests for a first vehicle 12, which may be either vehicle shown, and determining a receiving capacity of the first vehicle 12. Then, prioritizing the one or more update requests occurs based on the receiving capacity of the first vehicle 12 and sending the prioritized update requests to the first vehicle 12.

The drawings and figures presented herein are diagrams, are not to scale, and are provided purely for descriptive purposes. Thus, any specific or relative dimensions or alignments shown in the drawings are not to be construed as limiting. While the disclosure may be illustrated with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The term vehicle is broadly applied to any moving platform. Vehicles into which the disclosure may be incorporated include, for example and without limitation: passenger or freight vehicles; autonomous driving vehicles; industrial, construction, and mining equipment; and various types of aircraft.

All numerical values of parameters (e.g., of quantities or conditions) in this specification, including the appended claims, are to be understood as being modified in all instances by the term "about," whether or not the term actually appears before the numerical value. About indicates that the stated numerical value allows some slight imprecision (with some approach to exactness in the value; about or reasonably close to the value; nearly). If the imprecision provided by about is not otherwise understood in the art with this ordinary meaning, then about as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiments.

When used herein, the term "substantially" often refers to relationships that are ideally perfect or complete, but where manufacturing realities prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans will recognize the amount of acceptable variance. For example, and without limitation, coverages, areas, or distances may generally be within 10% of perfection for substantial equivalence. Similarly, relative alignments, such as parallel or perpendicular, may generally be considered to be within 5%.

FIG. 1 shows at least one additional vehicle 12 to which updates may also be sent. Note that updates may be batched, as prioritized update requests, between one vehicle 12 and the additional vehicle 12.

A remote or cellular communications system, or cellular network 16, which may be representative of many types of communications protocols, including, without limitation: cellular, satellite, Wi-Fi, BLUETOOTH™, or other communications recognizable to those having ordinary skill in the art. Several transfers 18 are schematically illustrated. These transfers 18 may include, without limitation: over-the-air (OTA), other transport protocols, including machine to machine (M2M), or using the network access device (NAD) of the vehicle 12, other telematics equipment, or other systems recognizable by those having ordinary skill in the art. M2M systems use point-to-point communications between machines, sensors, and hardware over cellular, Wi-Fi, or wired networks.

A back office 20, or BO 20, is shown highly schematically, but may be representative of many different structures, clouds, servers, or elements, as will be recognized by skilled artisans. The back office 20 represents systems that communicate with the vehicles 12 and may be determining what and/or when to send updates to the vehicles 12. The back office 20 includes numerous controllers 14.

Figure 2:
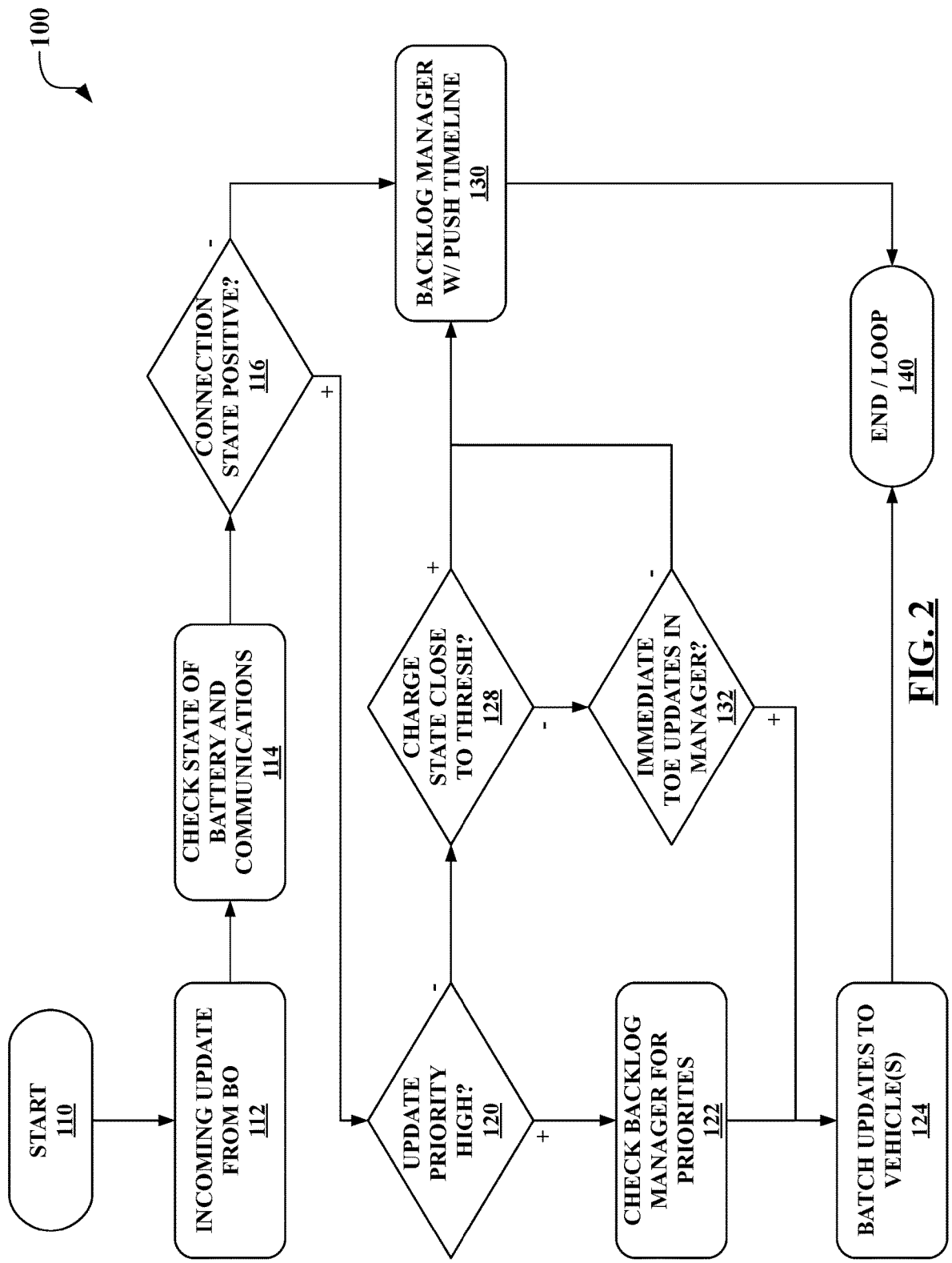
FIG. 2 is a schematic flow chart diagram of a smart scaled over-the-air (OTA) architecture system, illustrating positive and negative aspects.

FIG. 2 shows a schematic flow chart diagram of a method 100 for smart scaled over-the-air (OTA) or vehicle communications architecture system, illustrating positive and negative aspects or scenarios.

Step 110: START. At step 110 the method 100 initializes or starts. The method 100 may begin operation when called upon by the controller 14, may be constantly running, or may be looping iteratively.

Step 112: INCOMING UPDATE FROM BO. At step 112, the method 100 receives an update from the back office 20 for the vehicle 12. This may be processed by a communications controller 22 of the vehicles 12, which may be part of the controller 14 for the vehicles 12. The communications controller 22—for the vehicle 12, located in the back office 20, or elsewhere—may do several things, including, without limitation: profile importance, review radio maps, and/or determine how to transfer the data with aligned priorities. Note that the term communications controller 22 also includes, without limitation, cloud, mobile edge, and/or wireless network entity.

Step 114: CHECK STATE OF BATTERY AND COMMUNICATIONS. At step 114, the method 100 looks at whether a battery (not shown) of the vehicle 12 and the communications availability of the vehicle 12 have sufficient capabilities. The vehicle 12 may be a conventional vehicle, with only a starting, lighting, and ignition (SLI) battery; a hybrid vehicle, with a larger battery; or an electric vehicle, with a (likely) larger battery than the hybrid. Note that all vehicle types may include an SLI battery.

Method 100 looks at the communications state by testing or determining whether the vehicle 12 has sufficient capacity communication capacity to receive one or more updates. Note that the vehicle 12 may be in DRx mode, which generally refers to shutting down the remaining functions of the telematics module, and using substantially only the NAD, such that turning on the DRx mode may include using the NAD. This may include determining a receiving capacity of the vehicle 12.

Step 116: CONNECTION STATE POSITIVE? At step 116, the method 100 determines whether the connection state is positive between the cellular network 16 and the respective vehicle 12, or vehicles 12. If the connection state is positive, the method 100 proceeds to step 120, if not, the method proceeds to step 130. Note that the connection state between the back office 20 and the cellular network 16 may also be checked, though that is more likely to be positive.

Skilled artisans will recognize how to determine whether the connection state is positive. For example, and without limitation, if the signal has sufficient quality of service (QoS) and/or guaranteed bit rate (GBR), the state may be positive. If positive, method 100 moves to step 120, if negative, to step 130.

Positive scenarios involve the ability to immediately push some, or all, of the updates to the vehicles 12. Negative scenarios require prioritizing the packets to send to the vehicles 12.

Step 120: UPDATE PRIORITY HIGH? At step 120, the method 100 determines whether the priority of the update is high. Skilled artisans will recognize this determination, based on the specific needs of the vehicles 12 and the priority assigned by the back office 20. If the update priority is high, the method 100 proceeds to step 122, if not, the method proceeds to step 128.

Step 122: CHECK BACKLOG MANAGER FOR PRIORITIES. If the update priority is high, the method 100 checks the backlog, which may be part of the back office 20, for priorities of the updates available for the vehicles 12.

Step 124: BATCH UPDATES TO VEHICLE(S). At step 124, the method 100 sends a batch of updates to one or more vehicles 12.

Step 128: CHARGE STATE CLOSE TO THRESHOLD? At step 128, the method 100 determines whether the state of charge of the battery is close to a threshold. If the update priority is not high (as determined at step 120), the method 100 looks to see whether the battery charge is sufficient and/or close to the threshold. Skilled artisans will recognize threshold levels, based on the specific configurations of the vehicles 12. If the battery charge is sufficient, method 100 moves to step 130 and, if not, moves to step 132.

Step 130: BACKLOG MANAGER WITH PUSH TIMELINE. At step 130, if the determination of step 116 was negative, method 100 moves to a backlog manager and sets a timeline for pushing the updates to the vehicle. This may involve the vehicle 12 and/or back office 20 checking with the backlog manager for a repository list of OTA packages and priorities. Depending on the priority level of one or more updates in the package—as will be recognized by skilled artisans—the updates may be pushed, or attempted, very soon even with poor connection capability for the vehicle 12. Note that this step may include expirations for the push updates.

Step 132: IMMEDIATE TOE UPDATES IN MANAGER? At step 132, the method 100 determines whether there are immediate time of expiration (TOE) updates in the backlog manager. If there are immediate TOE updates, method 100 moves to step 124 to batch the updates to the vehicle 12. If not, method 100 moves back to step 130 with the backlog manager and push timeline. Immediate TOE updates may be recognizable by those having ordinary skill in the art, based on the type and/or priority of the updates involved.

Step 140: END/LOOP. At step 140, the method 100 ends or loops. The vehicles 12 have either had batched updates sent or the backlog manager has determined a proper timeline for pushing the updates to the vehicles 12. The end/loop step may then proceed, if necessary, back to the start step 110. Note that any of the methods described herein may include interrupt sequences, which may be used to interrupt the methods where necessary due to, for example, and without limitation, needing to implement another process.

Figure 3:
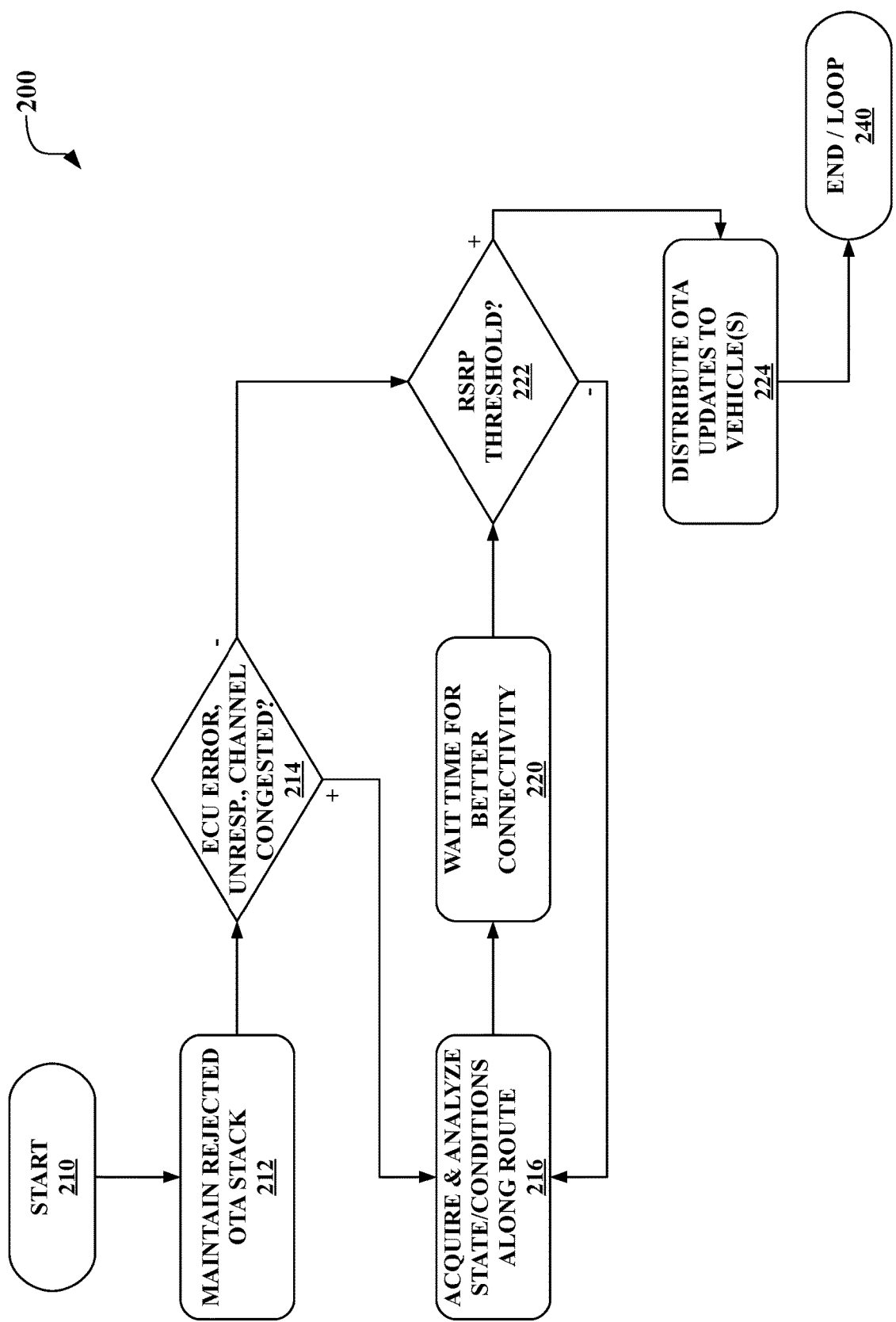
FIG. 3 is a schematic flow chart diagram of an OTA backlog based on priorities and failures.

FIG. 3 is a schematic flow chart diagram of a method 200 for an OTA backlog based on priorities and failures. The method 200 may work in concert with the method 100 on the vehicles 12.

Note that any of the methods described herein may be alternatives executed by the controller 14 of one of the vehicles 12. Additionally, any of the methods described herein may work together with the method 100.

Step 210: START. At step 210 the method 200 initializes or starts. The method 200 may begin operation when called upon by the controller 14, may be constantly running, or may be looping iteratively.

Step 212: MAINTAIN REJECTED OTA STACK AT BACKLOG MANAGER. At step 212, the method 200 looks at the OTA stack from the backlog manager. This may have been populated by the method 100 or by other means recognizable to those having ordinary skill in the art.

Step 214: ECU ERROR, UNRESPONSIVE CHANNEL, OR CONGESTED CHANNEL? At step 214, method 200 determines whether the vehicles 12 have any of the above issues. If one or more vehicles 12 has an electronic control unit (ECU) error, additional maintenance may be required and the back office 20 may alert one or more users to that need. Alternatively, method 200 may try again later and see whether the ECU error has corrected itself.

If there are unresponsive or congested channels, or ECU errors, method 200 proceeds to step 216 for analysis of route conditions. If there are no such issues, the method 200 moves to step 222.

Step 216: ACQUIRE AND ANALYZE STATE/CONDITIONS ALONG ROUTE. At step 216, method 200 begins acquiring and analyzing the network and channel state conditions along a planned route. Note that the planned route may be determined by several mechanisms, including, without limitation: entrance of the route into a GPS module of the vehicle 12, via a smart phone that is in communication with the back office 20, or systems that are estimating the route via past movements of the vehicle 12 or users.

Step 220: WAIT TIME FOR BETTER CONNECTIVITY AREA TO PUSH. At step 220 the method 200 sets a wait time (T), based on intelligence data analysis of the planned route. In this way, a better connectivity area may be found in order to push the updates to the vehicle 12.

Step 222: RSRP THRESHOLD? At step 222, the method 200 checks whether the real state of the reference signal received power (RSRP) is sufficient to receive the OTA updates. If so, the method moves to step 224. If not, the method reverts to step 216 to further acquire and analyze conditions along the route and wait for a better connectivity area.

Step 224: DISTRIBUTE CONSOLIDATED OTA UPDATES TO VEHICLE(S). At step 224, method 200 distributes one or more OTA updates to one or more vehicles 12.

Step 240: END/LOOP. At step 240, the method 200 ends or loops. The vehicles 12 have either had batched updates sent or the backlog manager has determined a proper timeline for pushing the updates to the vehicles 12. The end/loop step may then proceed, if necessary, back to the start step 210.

Figure 4:
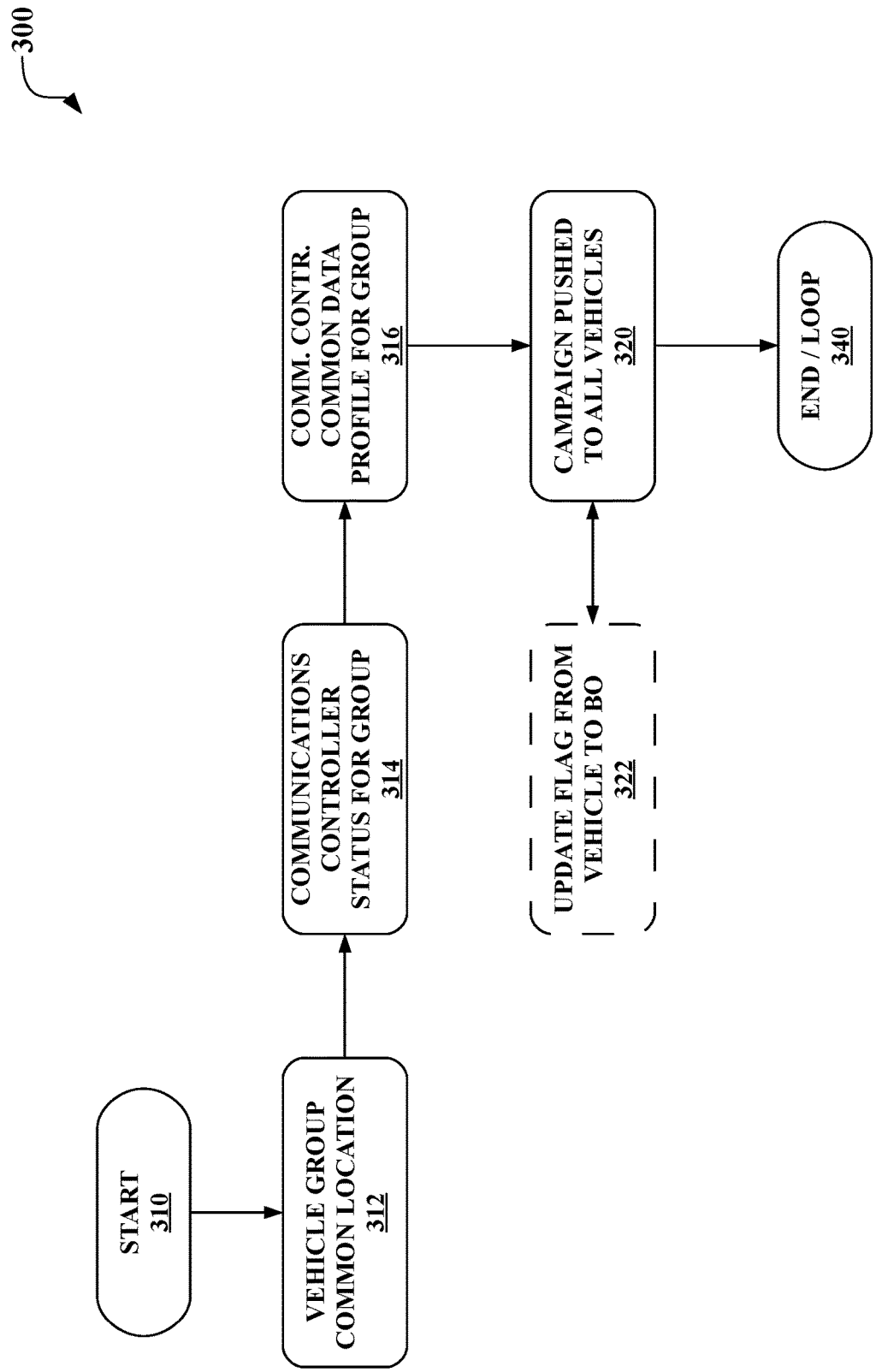
FIG. 4 is a schematic flow chart diagram of grouped profiling for a common vehicle set.

FIG. 4 is a schematic flow chart diagram of a pattern-based selection learning mode shown as a method 300 for grouped profiling for a common vehicle set. The common vehicle set includes at least two vehicles 12, but likely many more, and may be at, for example, and without limitation, a dealership in the United States or another country.

Step 310: START. At step 310 the method 300 initializes or starts. The method 300 may begin operation when called upon by one or more controllers 14, may be constantly running, or may be looping iteratively.

Step 312: VEHICLE GROUP IN COMMON LOCATION. At step 312, method 300 notes that a vehicle group is in common location. Note that step 312 may also determine that the common vehicle set is active.

Step 314: COMMUNICATIONS CONTROLLER STATUS FOR GROUP. At step 314, method 300 determines the status of the common vehicle set. Note that this may include determining that all vehicles 12 need similar updates or that some need one group of updates and others need different updates.

Step 316: COMMUNICATIONS CONTROLLER COMMON DATA PROFILE FOR GROUP. At step 316, method 300 sets a common data profile for the entire group.

Step 320: COMMON CAMPAIGN TO ALL VEHICLES. At step 320, method 300 sends a common campaign of updates to all vehicles 12 within the common vehicle set. Note that this may be determined by sorting all of the updates needed for individual vehicles 12 into a common set that needs to go to all of the vehicles 12. Subsequent, individual, updates may then be sent to individual updates, based on other methods discussed herein.

Step 322: UPDATE FLAG FROM VEHICLE TO BACK OFFICE (OPTIONAL). At optional step 322, method 300 may send an update flag from the vehicles 12 and the back office 20, or from the back office 20 to the vehicle 12. The update flag is state info message sent periodically and/or situationally from the network device of the vehicle 12 to the back office 20. Note that the update flag may be set to null, because the updates are common for the entire common vehicle set.

Step 340: END/LOOP. After sending the common campaign to the vehicles 12, the method 300 ends or loops.

Figure 5:
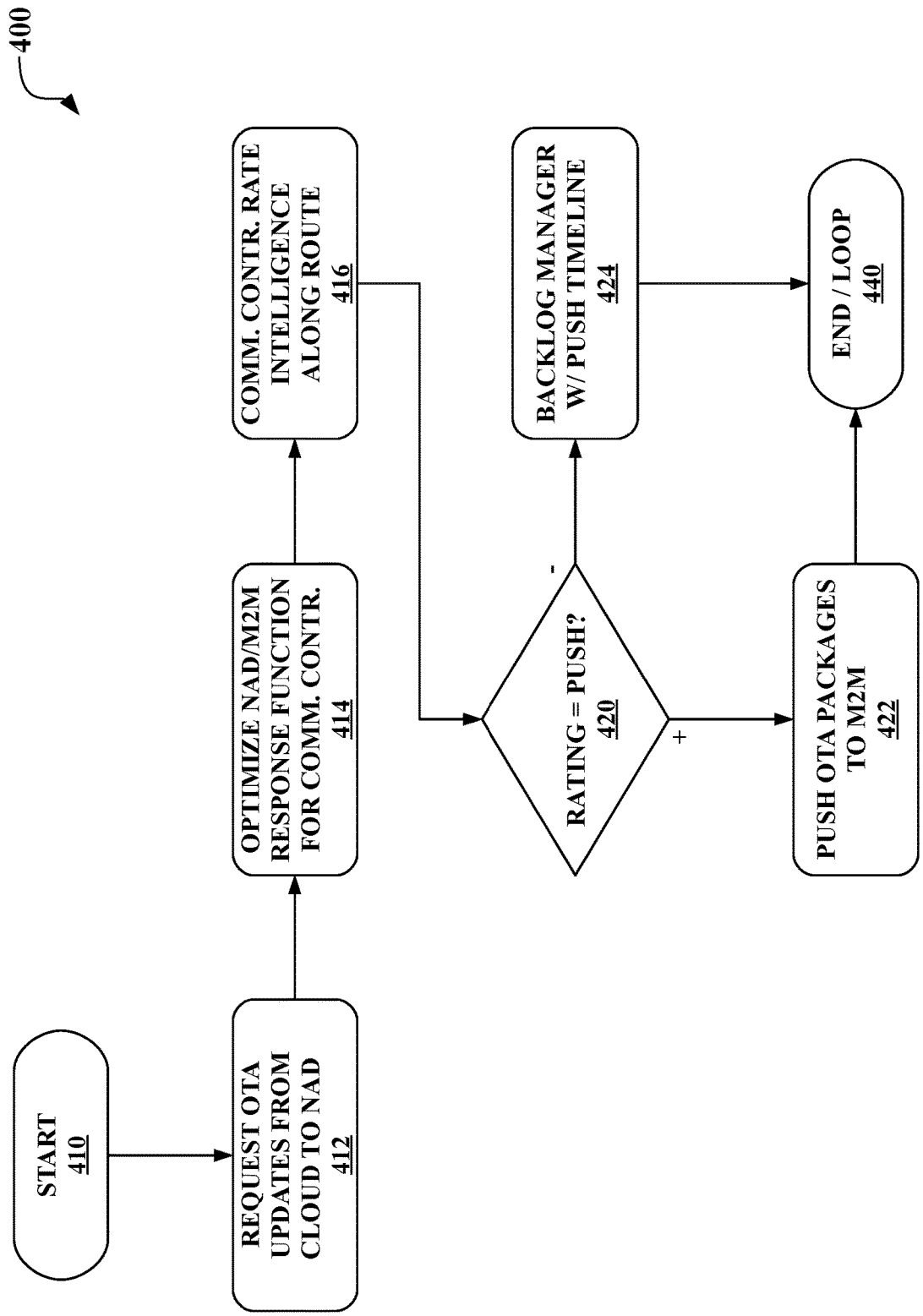
FIG. 5 is a schematic flow chart diagram of an optimized network access device (NAD) process for push and pull.

FIG. 5 is a schematic flow chart diagram of an optimized network access device (NAD) process for push and pull, represented by a method 400.

Step 410: START. At step 410 the method 400 initializes or starts. The method 400 may begin operation when called upon by one of the controllers 14, may be constantly running, or may be looping iteratively.

Step 412: REQUEST OTA UPDATES FROM CLOUD TO NAD. At step 412, method 400 requests to receive OTA updates from the cloud, likely via the back office 20, to the NAD of the vehicle 12.

Step 414: OPTIMIZE NAD/M2M RESPONSE FUNCTION FOR COMMUNICATIONS CONTROLLER. At step 414, method 400 optimizes a response function for the NAD and the M2M. Note that this may include using a high grade M2M processor, such that, generally, waking only the M2M processor saves power relative to waking the entire NAD of the vehicle 12.

Step 416: COMMUNICATIONS CONTROLLER RATES INTELLIGENCE ALONG ROUTE. At step 416, method 400 rates based on the M2M response and channel intelligence along the planned route.

Step 420: RATING=PUSH? At step 420, method 400 determines whether the rating at step 416 is sufficient to push the updates from the back office 20, via the cloud, to the vehicle 12. Skilled artisans will recognize whether the rating is sufficient for pushing the updates. If sufficient, method 400 moves to step 422, if not, to step 424.

Step 422: PUSH OTA PACKAGES TO M2M. At step 422, method 400 pushes the OTA update package, or packages, to the M2M of the vehicle 12. Push, generally means pushing the package from the BO 20 to the vehicle 12. Pull, generally, means that the vehicle 12 is not ready, so the update is pulled back instead of sending to the vehicle 12.

Step 424: BACKLOG MANAGER WITH PUSH TIMELINE. At step 424, if the determination of step 420 was negative, method 400 moves to a backlog manager and sets a timeline for pushing the updates to the vehicle. This may involve the vehicle 12 and/or back office 20 checking with the backlog manager for a repository list of OTA packages and priorities. These are stored OTA packages that were not sent initially. Depending on the priority level of one or more updates in the package—as will be recognized by skilled artisans—the updates may be pushed, or attempted, very soon even with poor connection capability for the vehicle 12. Note that this step may include expirations for the push updates.

Step 440: END/LOOP. After pushing or backlogging updates, the method 400 ends or loops.

Figure 6:
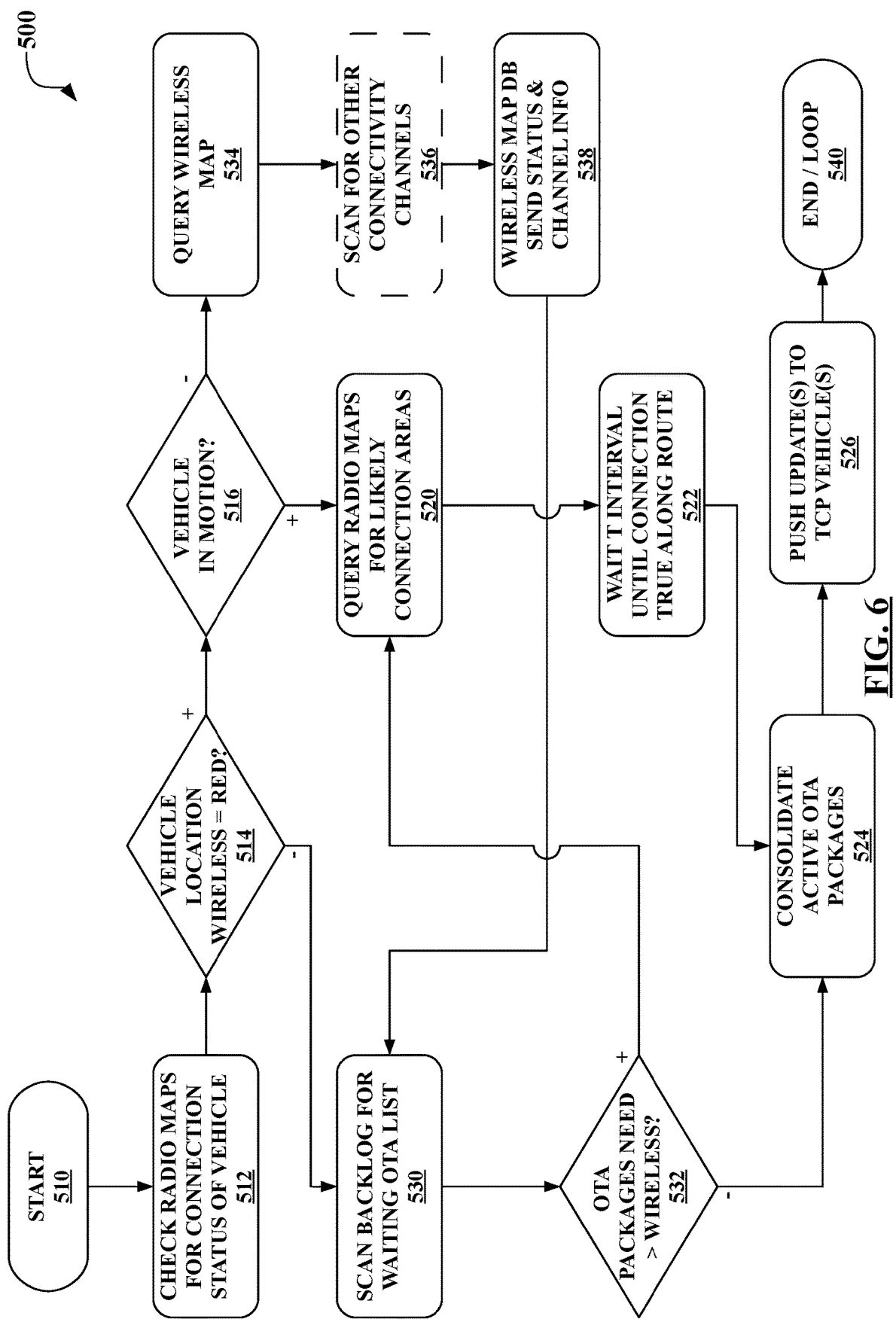
FIG. 6 is a schematic flow chart diagram of a radio map-based data and/or OTA profiling algorithm.

FIG. 6 is a schematic flow chart diagram of a radio map-based data and OTA profiling algorithm, represented by a method 500.

Step 510: START. At step 510, the method 500 initializes or starts. The method 500 may begin operation when called upon by one of the controllers 14, may be constantly running, or may be looping iteratively. The method 500 may begin when an OTA package request is received by the communications controller 22, the back office 20, or both.

Step 512: CHECK RADIO MAPS FOR CONNECTION STATUS OF VEHICLE. At step 512, method 500 checks maps for the—predicted, expected, or likely—connection status of the vehicle 12.

Step 514: VEHICLE LOCATION WIRELESS=POOR/RED? At step 514, method 500 determines whether the wireless at the location of the vehicle 12 is poor or red. This refers to wireless maps where red shows lack of coverage and/or poor coverage in the area of the vehicle 12. If the area is poor/red, method 500 moves to step 516, if not, method 500 moves to step 530. Note that many types of wireless may be examined, including, without limitation, 5G, other cellular networks, and Wi-Fi.

Step 516: VEHICLE IN MOTION? At step 516, method 500 determines whether the vehicle 12 is in motion. If in motion, method 500 moves to step 520, if not, to step 534.

Step 520: QUERY RADIO MAPS FOR LIKELY CONNECTION AREAS. At step 520, method 500 queries the radio maps for likely connection areas for the vehicle 12, likely along the planned route. This involves determining when the vehicle 12 will be in an area of higher quality or additional quality wireless connection and/or access.

Querying the radio maps may include additional features. For example, and without limitation, there may be dynamic network-based data profiling. This may include creating different profiles based on different sets of communications available for the vehicle 12. From the different profiles, the methods may select the best connection speed and or type from the different profiles.

Then, the methods may update the radio maps based on the best connection speed and or type from the different profiles. Additionally, the methods may send feedback to the communications controller 22—including, without limitation clouds, mobile edge, and/or wireless network entities—based on the best connection speed and or type from the different profiles. Additionally, and without limitation, the back office 20 may receive feedback from the NAD for native (i.e., home) and non-native (i.e., roaming) areas based on the NAD profiling logic. This may be used to further refine the radio maps.

Step 522: WAIT T INTERVAL UNTIL CONNECTION TRUE ALONG ROUTE. At step 522, method 500 waits an interval (T) until the connection is better along the planned route. The route based knowledge may allow method 500 to predict when the vehicle 12 will be in the higher quality wireless connection area, and plan the interval (T) to meet that area.

Step 524: CONSOLIDATE ACTIVE OTA PACKAGES. At step 524, method 500 consolidates the active OTA packages in preparation for sending to the vehicles 12.

Step 526: PUSH UPDATE(S) TO TCP OF VEHICLE(S). At step 526, method 500 pushes one or more updates to one or more vehicles 12. Telematics communication platform (TCP) involves both NAD and telematics and includes an application processor and a communications processor. Following the push, the method 500 ends or loops.

Step 530: SCAN BACKLOG FOR WAITING OTA LIST. At step 530, if step 514 determines that the wireless location was not poor/red, method 500 scans the backlog to see whether there are OTA updates waiting.

Step 532: OTA PACKAGES NEED GREATER WIRELESS? At step 532, method 500 determines whether the number of the OTA packages needs greater, or equal, amounts of wireless to be sent. This may include analyzing the quality of service (QOS) and/or guaranteed bit rate (GBR).

If step 532 determines that there is need for greater wireless, method 500 moves back to step 520 to query the radio maps and waiting for a better area. If step 532 determines that there is sufficient wireless, method 500 proceeds to step 524 to consolidate and push the packages.

Step 534: QUERY WIRELESS MAP. At step 534, if step 516 determines that the vehicle 12 is not in motion, method 500 queries the wireless map(s).

Step 536: SCAN OTHER CONNECTIVITY CHANNELS (OPTIONAL). At optional step 536, method 500 scans for other connectivity channels that may have better service. This may include looking for higher guaranteed bit rates (GBRs), or other mechanisms that can better send updates to one or more vehicles 12.

Step 538: WIRELESS MAP DB SEND STATUS & CHANNEL INFO. At step 538, method 500 sends a wireless map database the status and channel information. This may include sending information for a location where the connectivity is possible to send the updates. Following step 538, method 500 moves back to step 530 to scan the backlog.

Step 540: END/LOOP. The method 400 ends or loops, which may include going back to start step 510.

The detailed description and the drawings or figures are supportive and descriptive of the subject matter herein. While some of the best modes and other embodiments have been described in detail, various alternative designs, embodiments, and configurations exist.

Furthermore, any examples shown in the drawings or the characteristics of various examples mentioned in the present description are not necessarily to be understood as examples independent of each other. Rather, it is possible that each of the characteristics described in one of the examples of an embodiment can be combined with one or a plurality of other desired characteristics from other examples, resulting in other examples not described in words or by reference to the drawings. Accordingly, such other examples fall within the framework of the scope of the appended claims.

The invention claimed is:

1. A method of prioritizing updates to vehicles, comprising:
   receiving one or more update requests for a first vehicle;
   determining a receiving capacity of the first vehicle;
   checking status of a battery and communications of the first vehicle;
   prioritizing the one or more update requests based on the receiving capacity of the first vehicle;
   sending the prioritized update requests to the first vehicle;
   requesting over-the-air updates from a cloud;
   determining whether a wireless network has sufficient capabilities to push the over-the-air updates to the first vehicle;
   if the wireless network does not have sufficient capabilities to push the over-the-air updates, sending the over-the-air updates to a backlog manager, which stores the over-the-air updates;
   if the wireless network does have sufficient capabilities to push the over-the-air updates, pushing the over-the-air updates to a machine to machine controller of the first vehicle;
   prioritizing the packets based on one or more determined priorities; and
   optimizing a network access device to only use the machine to machine controller, thereby saving power relative to waking the network access device in its entirety.

2. A non-transitory computer-readable storage medium on which is recorded instructions, wherein execution of the instructions by a processor causes the processor to:
   receive one or more vehicle communications update requests for one or more vehicles;
   determine a receiving capacity of each of the one or more vehicles;
   prioritize the one or more vehicle communications update requests based on the receiving capacity of each of the one or more vehicles;
   send the prioritized one or more vehicle communications update requests to each of the one or more vehicles;
   send the prioritized one or more vehicle communications update requests via a wireless communications system, wherein sending the prioritized one or more vehicle communications update requests via the wireless communications system occurs from a back office through a cloud;
   prioritize the packets based on one or more determined priorities;
   determine whether there are high priority updates or whether there are immediate time of expiration updates needed for the one or more vehicles; and
   push either the high priority updates or the immediate time of expiration to the one or more vehicles.

3. The non-transitory computer-readable storage medium on which is recorded instructions of claim 2, wherein execution of the instructions by the processor causes the processor to:
   determine whether a charge state of a battery of one or more vehicles is close to a threshold; and
   if the charge the state of the battery is close to the threshold, send the update to a back log manager for later deployment of the one or more vehicle communications update requests.

4. The non-transitory computer-readable storage medium on which is recorded instructions of claim 2, wherein execution of the instructions by the processor causes the processor to:
   create a first profile based on a first set of communications available on one vehicle of the one or more vehicles;
   create a second profile based on a second set of communications available to the one vehicle;

select a best connection speed from the first profile and the second profile;
update one or more radio maps based on the best connection speed from the first profile and the second profile; and
send feedback to a communications controller based on the best connection speed from the first profile and the second profile.

5. The non-transitory computer-readable storage medium on which is recorded instructions of claim 4, wherein execution of the instructions by the processor causes the processor to:
determine whether a charge state of a battery of one or more vehicles is close to a threshold; and
if the charge the state of the battery is close to the threshold, send the update to a back log manager for later deployment of the one or more vehicle communications update requests.

\* \* \* \* \*